(12) United States Patent
Sharma et al.

(10) Patent No.: US 12,450,752 B2
(45) Date of Patent: Oct. 21, 2025

(54) MOTION CORRECTION OF IMAGES CORRUPTED BY MULTIPLE MOTION SOURCES

(71) Applicant: CANON MEDICAL SYSTEMS CORPORATION, Tochigi (JP)

(72) Inventors: Anuj Sharma, Vernon Hills, IL (US); Sampada Bhave, Beachwood, OH (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 466 days.

(21) Appl. No.: 17/718,957

(22) Filed: Apr. 12, 2022

(65) Prior Publication Data

US 2023/0169663 A1    Jun. 1, 2023

Related U.S. Application Data

(60) Provisional application No. 63/283,659, filed on Nov. 29, 2021.

(51) Int. Cl.
| | | |
|---|---|---|
| *G06T 7/215* | (2017.01) | |
| *G06T 5/50* | (2006.01) | |
| *G06V 10/25* | (2022.01) | |
| *G06V 10/44* | (2022.01) | |

(52) U.S. Cl.
CPC ............ *G06T 7/215* (2017.01); *G06T 5/50* (2013.01); *G06V 10/25* (2022.01); *G06V 10/454* (2022.01); *G06T 2207/20216* (2013.01)

(58) Field of Classification Search
None
See application file for complete search history.

(56) References Cited

U.S. PATENT DOCUMENTS

| | | | | |
|---|---|---|---|---|
| 11,536,791 B1 * | 12/2022 | Nambu | ............... | G01R 33/5608 |
| 2003/0214290 A1 * | 11/2003 | van Muiswinkel | ....... | G06T 5/50 |
| | | | | 324/318 |
| 2010/0220909 A1 * | 9/2010 | Thielemans | .......... | G06T 11/005 |
| | | | | 382/131 |
| 2010/0237865 A1 * | 9/2010 | Stemmer | ............ | G01R 33/5611 |
| | | | | 324/309 |
| 2011/0116683 A1 * | 5/2011 | Kramer | ............... | G01R 33/5676 |
| | | | | 382/103 |
| 2012/0133655 A1 * | 5/2012 | Kristjansson | ........ | A61B 5/1122 |
| | | | | 702/19 |
| 2015/0093001 A1 * | 4/2015 | Wang | ........................ | G06T 7/70 |
| | | | | 382/131 |
| 2016/0140726 A1 * | 5/2016 | Jo | ............................. | G06T 7/11 |
| | | | | 382/131 |

(Continued)

FOREIGN PATENT DOCUMENTS

EP    3358820 A1 *    8/2018    .......... G06T 3/4015

*Primary Examiner* — Akwasi M Sarpong
*Assistant Examiner* — Pawan Dhingra
(74) *Attorney, Agent, or Firm* — Oblon, McClelland, Maier & Neustadt, L.L.P.

(57) ABSTRACT

The present disclosure relates to dividing image data obtained from a scan (e.g. MRI) of an object into two or more sets of data corresponding do unique motion patterns and/or motion sources. Each of the two or more sets of data can be corrected using an appropriate correction technique. One appropriate correction techniques includes generating kernels for each divided imaging dataset using center and adjacent slice information to correct for through-plane and in-plane artifacts.

18 Claims, 8 Drawing Sheets

(56) References Cited

U.S. PATENT DOCUMENTS

| | | | |
|---|---|---|---|
| 2017/0074959 A1* | 3/2017 | Li | G01R 33/5676 |
| 2017/0122890 A1* | 5/2017 | Inoue | H01J 37/28 |
| 2019/0057495 A1* | 2/2019 | Shionoya | H04N 23/843 |
| 2019/0128985 A1* | 5/2019 | Nauerth | G01R 33/5676 |
| 2020/0341100 A1* | 10/2020 | Heukensfeldt Jansen | G01R 33/4818 |
| 2021/0037218 A1* | 2/2021 | Shionoya | H04N 25/533 |
| 2021/0272335 A1* | 9/2021 | Huang | G06T 7/0012 |
| 2021/0287346 A1* | 9/2021 | Ikeda | A61B 1/00193 |
| 2022/0065969 A1* | 3/2022 | Brada | G06T 7/0012 |
| 2022/0172410 A1* | 6/2022 | Wheaton | G06T 11/005 |
| 2022/0215540 A1* | 7/2022 | Weiss | G06T 7/0012 |
| 2022/0253987 A1* | 8/2022 | Delso Gafarot | G06T 5/73 |
| 2022/0392018 A1* | 12/2022 | Chen | G06T 5/70 |

* cited by examiner

MOTION CORRECTION OF IMAGES CORRUPTED BY MULTIPLE MOTION SOURCES

CROSS-REFERENCE TO CO-PENDING APPLICATION

The present application relates to and claims priority under 35 U.S.C. § 119(e) to U.S. Provisional Patent Application No. 63/283,659 filed on Nov. 29, 2021, the contents of which are incorporated herein by reference.

BACKGROUND

Motion artifacts are a common problem in medical imaging, such as magnetic resonance imaging (MRI). In a given scan of a body, there may be different sources of motion (e.g. heart, lungs, throat) having unique motion characteristics. For example, cardiac motion and respiratory motion are both approximately periodic (e.g. 60-72 beats per minutes, 12-15 cycles of inspiration/expiration), whereas swallowing and coughing may be aperiodic. Motion correction techniques typically aim to uniformly correct all motion at once, without considering the variations in motion that can occur for different regions of the body. The result is a correction that is often sub-optimal, and may contain residual artifacts that have not been fully corrected.

SUMMARY

The present disclosure relates to an imaging apparatus, including, but not limited to: a plurality of detectors configured to capture imaging data from a scan of an object; and circuitry configured to divide the imaging data into a first set corresponding to a first region of the object and a second set corresponding to a second region of the object, wherein the second region is different than the first region, the first region has a first motion pattern, and the second region has a second motion pattern different than the first motion pattern, apply a first correction process to the first set, apply a second correction process to the second set, the second correction process being different than the first correction process, and generate an image including the first region and the second region, the image being generated based on a result of the first correction process and the second correction process.

The present disclosure also relates to a correction method, including, but not limited to: dividing imaging data into a first set corresponding to a first region of an object and a second set corresponding to a second region of the object, wherein the second region is different than the first region, the first region has a first motion pattern, and the second region has a second motion pattern different than the first motion pattern; applying a first correction process to the first set; applying a second correction process to the second set, the second correction process being different than the first correction process; and generating an image including the first region and the second region, the image being generated based on a result of the first correction process and the second correction process.

The present disclosure also relates to a non-transitory computer-readable storage medium storing computer-readable instructions that, when executed by a computer, cause the computer to perform a method including, but not limited to, dividing imaging data into a first set corresponding to a first region of an object and a second set corresponding to a second region of the object, wherein the second region is different than the first region, the first region has a first motion pattern, and the second region has a second motion pattern different than the first motion pattern, applying a first correction process to the first set, applying a second correction process to the second set, the second correction process being different than the first correction process, and generating an image including the first region and the second region, the image being generated based on a result of the first correction process and the second correction process.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure is related to generating a motion corrected image from an imaging scan by utilizing a process that takes into account different motion sources and/or patterns, and corrects for each motion separately. This allows for a more complete correction compared to techniques that jointly correct artifacts from all motion sources, since motion correction is customized to the characteristics of spatially localized motion.

In one embodiment, it can be appreciated that the present disclosure can be viewed as a system. While the present exemplary embodiments will refer to an MRI apparatus, it can be appreciated that other system configurations can use other medical imaging apparatuses (e.g. computed tomography apparatus).

Figure 1:
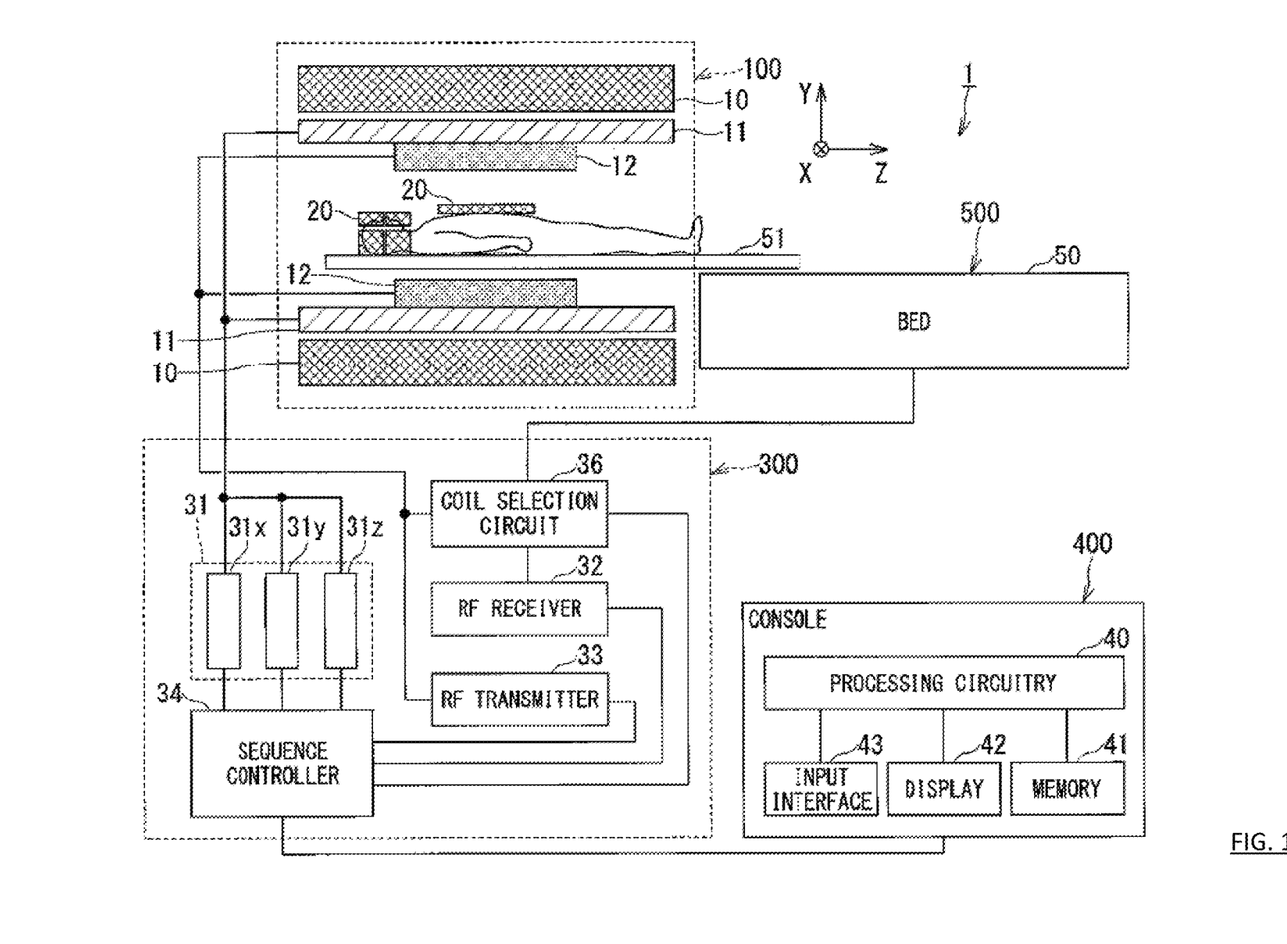
FIG. 1 is a schematic of an MRI apparatus.

Referring now to the drawings, FIG. 1 is a block diagram illustrating overall configuration of an MRI apparatus 1. The MRI apparatus 1 includes a gantry 100, a control cabinet 300, a console 400, a bed 500, and radio frequency (RF) coils 20. The gantry 100, the control cabinet 300, and the bed 500 constitute a scanner, i.e., an imaging unit.

The gantry 100 includes a static magnetic field magnet 10, a gradient coil 11, and a whole body (WB) coil 12, and these components are housed in a cylindrical housing. The bed 500 includes a bed body 50 and a table 51.

The control cabinet 300 includes three gradient coil power supplies 31 (31x for an X-axis, 31y for a Y-axis, and 31z for a Z-axis), a coil selection circuit 36, an RF receiver 32, an RF transmitter 33, and a sequence controller 34.

The console 400 includes processing circuitry 40, a memory 41, a display 42, and an input interface 43. The console 400 functions as a host computer.

The static magnetic field magnet 10 of the gantry 100 is substantially in the form of a cylinder and generates a static magnetic field inside a bore into which an object such as a patient is transported. The bore is a space inside the cylindrical structure of the gantry 100. The static magnetic field magnet 10 includes a superconducting coil inside, and the superconducting coil is cooled down to an extremely low temperature by liquid helium. The static magnetic field magnet 10 generates a static magnetic field by supplying the superconducting coil with an electric current provided from a static magnetic field power supply (not shown) in an excitation mode. Afterward, the static magnetic field magnet 10 shifts to a permanent current mode, and the static magnetic field power supply is separated. Once it enters the permanent current mode, the static magnetic field magnet 10 continues to generate a strong static magnetic field for a long time, for example, over one year. In FIG. 1, the black circle on the chest of the object indicate the magnetic field center.

The gradient coil 11 is also substantially in the form of a cylinder and is fixed to the inside of the static magnetic field magnet 10. This gradient coil 11 applies gradient magnetic fields (for example, gradient pulses) to the object in the respective directions of the X-axis, the Y-axis, and the Z-axis, by using electric currents supplied from the gradient coil power supplies 31x, 31y, and 31z.

The bed body 50 of the bed 500 can move the table 51 in the vertical direction and in the horizontal direction. The bed body 50 moves the table 51 with an object placed thereon to a predetermined height before imaging. Afterward, when the object is imaged, the bed body 50 moves the table 51 in the horizontal direction so as to move the object to the inside of the bore.

The WB body coil 12 is shaped substantially in the form of a cylinder so as to surround the object and is fixed to the inside of the gradient coil 11. The WB coil 12 applies RF pulses transmitted from the RF transmitter 33 to the object. Further, the WB coil 12 receives magnetic resonance signals, i.e., MR signals emitted from the object due to excitation of hydrogen nuclei.

The MRI apparatus 1 may include the RF coils 20 as shown in FIG. 1 in addition to the WB coil 12. Each of the RF coils 20 is a coil placed close to the body surface of the object. There are various types for the RF coils 20. For example, as the types of the RF coils 20, as shown in FIG. 1, there are a body coil attached to the chest, abdomen, or legs of the object and a spine coil attached to the back side of the object. As another type of the RF coils 20, for example, there is a head coil for imaging the head of the object. Although most of the RF coils 20 are coils dedicated for reception, some of the RF coils 20 such as the head coil are a type that performs both transmission and reception. The RF coils 20 are configured to be attachable to and detachable from the table 51 via a cable.

The RF transmitter 33 generates each RF pulse on the basis of an instruction from the sequence controller 34. The generated RF pulse is transmitted to the WB coil 12 and applied to the object. An MR signal is generated from the object by the application of one or plural RF pulses. Each MR signal is received by the RF coils 20 or the WB coil 12.

The MR signals received by the RF coils 20 are transmitted to the coil selection circuit 36 via cables provided on the table 51 and the bed body 50. The MR signals received by the WB coil 12 are also transmitted to the coil selection circuit 36

The coil selection circuit 36 selects MR signals outputted from each RF coil 20 or MR signals outputted from the WB coil depending on a control signal outputted from the sequence controller 34 or the console 400.

The selected MR signals are outputted to the RF receiver 32. The RF receiver 32 performs analog to digital (AD) conversion on the MR signals, and outputs the converted signals to the sequence controller 34. The digitized MR signals are referred to as raw data in some cases. The AD conversion may be performed inside each RF coil 20 or inside the coil selection circuit 36.

The sequence controller 34 performs a scan of the object by driving the gradient coil power supplies 31, the RF transmitter 33, and the RF receiver 32 under the control of the console 400. When the sequence controller 34 receives raw data from the RF receiver 32 by performing the scan, the sequence controller 34 transmits the received raw data to the console 400.

The sequence controller 34 includes processing circuitry (not shown). This processing circuitry is configured as, for example, a processor for executing predetermined programs or configured as hardware such as a field programmable gate array (FPGA) or an application specific integrated circuit (ASIC).

The console 400 includes the memory 41, the display 42, the input interface 43, and the processing circuitry 40 as described above.

The memory 41 is a recording medium including a read-only memory (ROM) and a random access memory (RAM) in addition to an external memory device such as a hard disk drive (HDD) and an optical disc device. The memory 41 stores various programs executed by a processor of the processing circuitry 40 as well as various types of data and information.

The input interface 43 includes various devices for an operator to input various types of information and data, and is configured of a mouse, a keyboard, a trackball, and/or a touch panel, for example.

The display 42 is a display device such as a liquid crystal display panel, a plasma display panel, and an organic EL panel.

The processing circuitry 40 is a circuit equipped with a central processing unit (CPU) and/or a special-purpose or general-purpose processor, for example. The processor implements various functions described below (e.g. method 700) by executing the programs stored in the memory 41. The processing circuitry 40 may be configured as hardware such as an FPGA and an ASIC. The various functions described below can also be implemented by such hardware. Additionally, the processing circuitry 40 can implement the various functions by combining hardware processing and software processing based on its processor and programs.

As previously mentioned, the present disclosure is related to generating a high quality image from an image scan by utilizing a process that takes into account different motion sources and/or patterns. Instead of uniformly correcting motion artifacts, artifacts from each motion source and/or pattern are corrected separately, where different motion correction methods can be applied to different motion sources and/or patterns. For example, in regions near the spine, different motion sources cause artifacts in different regions within the field of view. Swallowing motion in the mouth can cause artifacts in the superior c-spine region, while cardiac and respiration motion in the chest can cause artifacts in the inferior c-spine region. In such a case, motion from the various regions can be corrected separately, then combined to form a composite, motion-corrected image.

The types of motion can generally fall into two categories: predicable and unpredictable. Predictable motion can include motion that is approximately periodic, non-sporadic, rigid, etc., while unpredictable motion can include motion that is aperiodic, sporadic, non-rigid, etc. Examples of predictable motion include breathing in the lung region and a beating heart. Examples of unpredictable motion include coughing, swallowing, or sneezing in the throat region.

An image dataset (e.g. MRI dataset) obtained from scanning a field of view can be divided into different regions of interest having different motion characteristics. For example, a first region is near the chest for cardiac and respiratory motion, a second region is near the throat for swallowing motion, and a third region is near the head for head motion. Thereafter, different motion correction methods, specifically suited for each designated region/anatomy/motion pattern, can be applied.

In one embodiment, the regions of interest can be defined based on (1) coil sensitivity maps, (2) spatial patches based on anatomy, (3) patches in k-space exploiting frequency domain signal similarity, or (4) a combination thereof. In cases (1) and (2), each coil/spatial patch views a different region, while in case (3), k-space patches along slice dimensions share similar signal information.

In one embodiment of the present disclosure, imaging data is divided into multiple sets based on regions affected by different motion using coil sensitivity maps and/or spatial patches based on anatomy. Thereafter, each set is separately corrected using an appropriate correction technique. For example, unpredictable motion can be corrected using techniques like COCOA, which find inconsistencies between acquired k-space data and synthesized data using a convolution kernel (e.g., GRAPPA), and replaces or rejects inconsistent data to reduce motion artifacts (See, e.g., (1) [Huang 2010]: (Huang et al. Data convolution and combination operation (COCOA) for motion ghost artifacts reduction. MRM 64:157-166, 2010), and (2) [Huang 2012]: (Huang et al. Advantages of channel by channel artifact detection and correction. #3434, ISMRM 2012.)), both of which are incorporated herein by reference. Moreover, predictable motion can be corrected using self-navigation methods, where acquired data itself can be used to estimate motion and correct for it. Of course, other appropriate motion correction methods can be used in other scenarios.

Figure 2A:
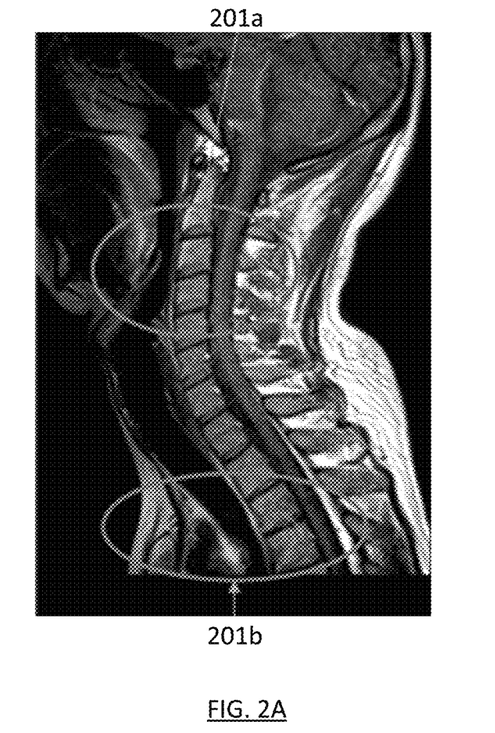
FIG. 2A shows an image of an object having artifacts due to swallowing in one region and artifacts due to cardiac motion in a different region.

FIG. 2A shows an image of a spine region captured by an MRI apparatus using nine coils, where the image includes artifacts 201a due to swallowing and artifacts 201b due to cardiac motion. The artifacts 201a due to swallowing are localized to a different region and have a different motion pattern than artifacts 201b due to cardiac motion.

Figure 2B:
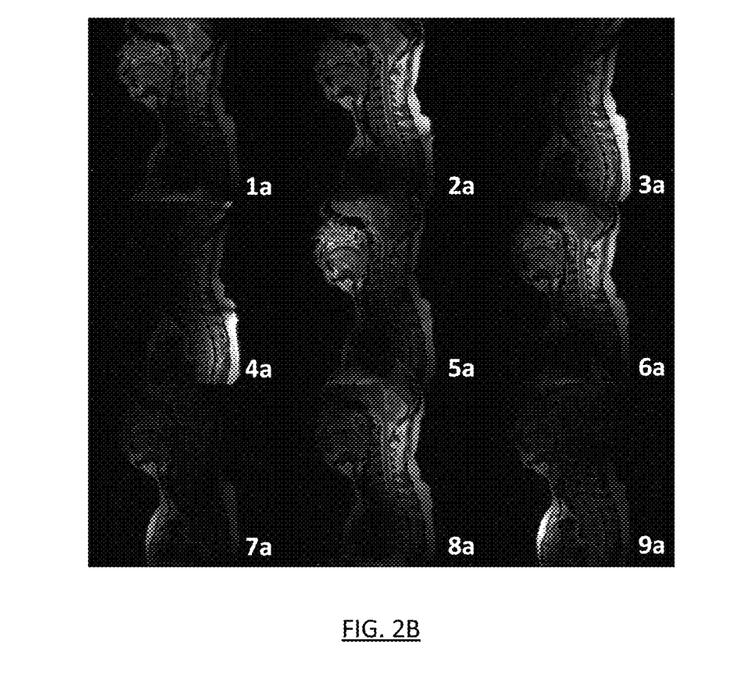
FIG. 2B shows nine images of the object from FIG. 2A taken by nine corresponding coils.

FIG. 2B shows nine low-resolution images 1a-9a acquired separately from nine corresponding coil elements in the MRI apparatus used during c-spine imaging of the region from FIG. 2A. The spatial patches based on anatomy can be utilized to know which coils are directed to which anatomy. For example, it can be made known that the coils used to capture images 2a, 5a, and 6a are directed towards the throat, and that the coils used to captures images 3a, 4, and 9a are directed to the heart.

Figure 2C:
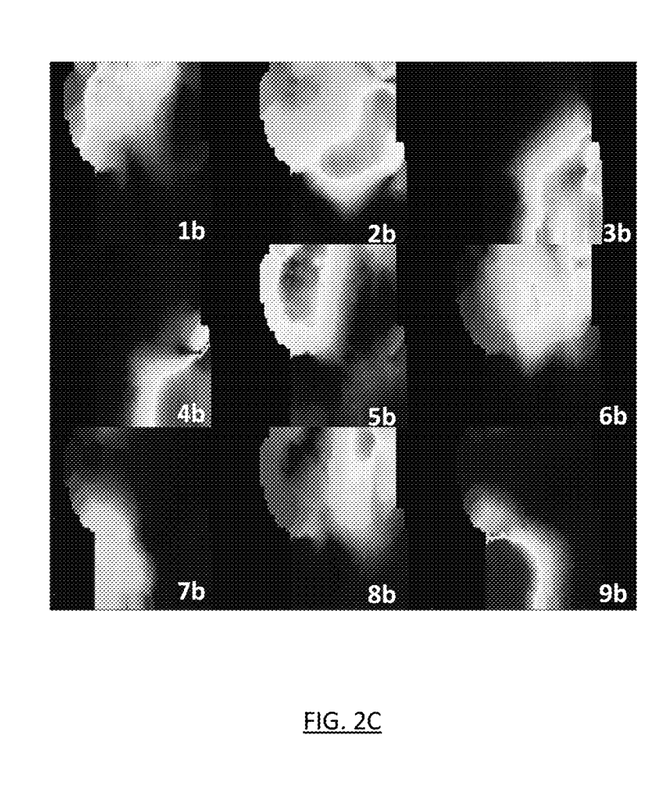
FIG. 2C shows nine coil sensitivity maps corresponding to the nine images from FIG. 2B.

FIG. 2C shows respective coil sensitivity maps 1b-9b for each of the coils used to generate images 1a-9a from FIG. 2B. The coil sensitivity maps 1b-9b quantify the relative weighting of signals from different points of origin within the reception area of each coil.

Figure 2D:
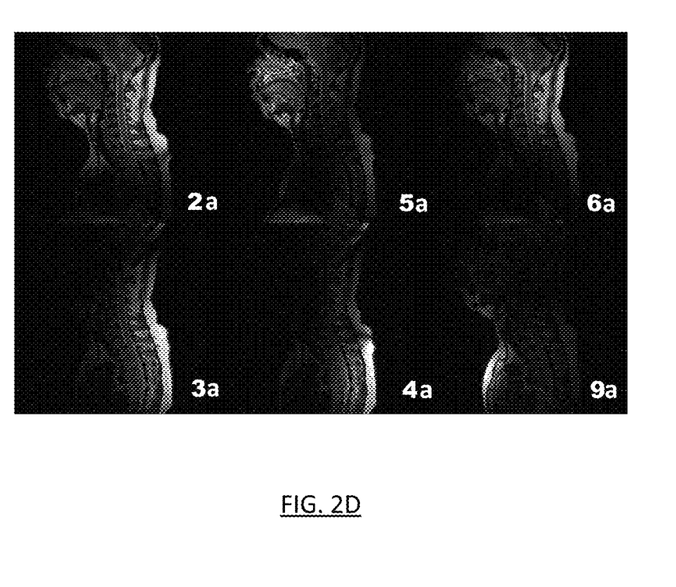
FIG. 2D shows images taken from coils sensitive to artifacts due to swallowing and images taken from coils sensitive to artifacts due to cardiac motion.

The coil sensitivity maps 1b-9b provide a natural segmentation of regions that may be affected by artifact from different motion sources. For example, referring to FIG. 2D, it can be known that coils used to captures images 2a, 5a, and 6a are sensitive to the region with artifacts 201a due to swallowing, and that coils used to capture images 3a, 4a, and 9a are sensitive to the region with artifacts 201b due to cardiac motion. Therefore, imaging data collected from the former set of coils can be corrected using a first correction process specialized for correcting the artifacts 201a due to swallowing, while imaging data collected from the latter set of coils can be corrected using a second correction process specialized for correcting the artifacts 201b due to cardiac motion.

In an embodiment, data rejection can be included. For instance, portions of data collected from an MRI scan having particular characteristics can be removed. Examples of characteristics warranting data rejection can include motion outside a defined location, motion outside a predetermined frequency range, and/or motion having a particular pattern.

Figure 3A:
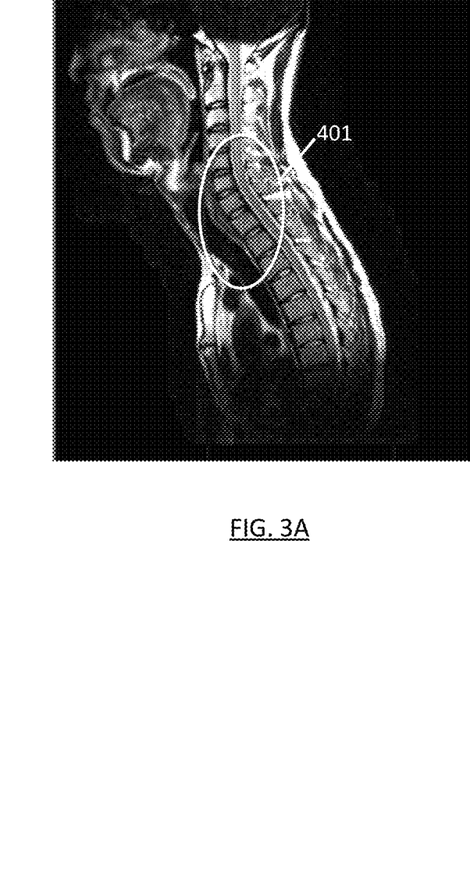
FIG. 3A shows an image of an object without data rejection.
Figure 3B:
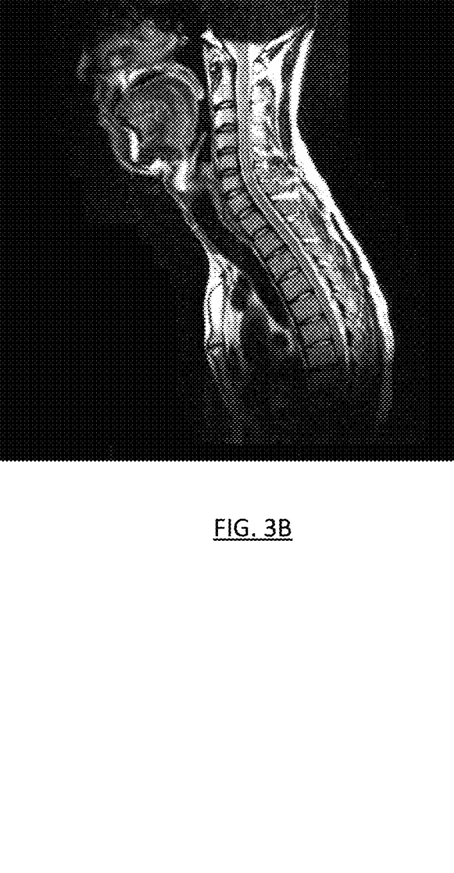
FIG. 3B shows an image of the object with data rejected from four coils.
Figure 3C:
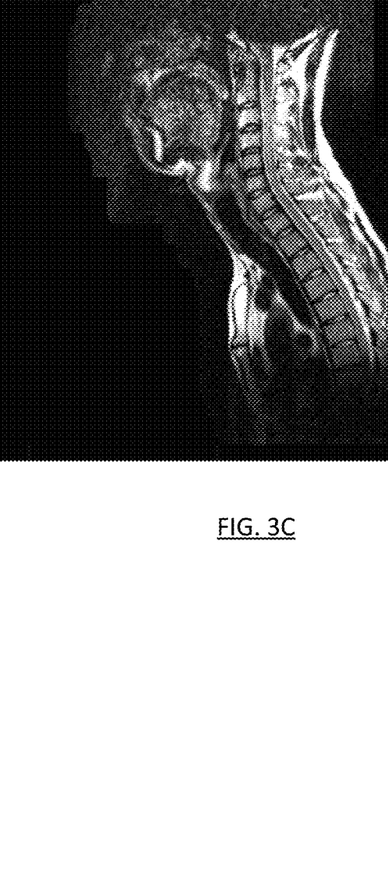
FIG. 3C shows an image of the object with data rejected from five coils.

To illustrate the effects of reducing artifacts via data rejection, FIG. 3A shows an MRI image, constructed without using data rejection, with artifacts near the neck region 401. FIG. 3B shows the MRI image with data rejected from four coils that are sensitive to motion near the neck region 401. FIG. 3C shows the same MRI image with data rejected from five coils (including the same four coils from FIG. 3B) that are sensitive to motion near the neck region 401. As can be seen, rejecting data reduces the motion artifacts near the neck region 401 (at the expense of reduced signal-to-noise-ratio).

Furthermore, data rejection can be coupled with other navigator-based motion correction techniques, which are independent of the type of motion. Data having certain motion states can be accepted or rejected. This can look like, for example, rejecting portions of k-space data that are corrupted with motion. As another example, for periodic motion (e.g. respiration or cardiac pulsations), data from peak inhalation, exhalation, systolic phase, and/or diastolic phase can be rejected.

Navigators can also be employed in other ways. For example, navigators can be used to bin data having similar motion states, and corrected for each motion state separately. As another example, navigators can be used to estimate motion of a specific body part, and correct for it retrospectively.

Therefore, in one embodiment, the acquisition of imaging data can be preceded or succeeded by the acquisition of non-imaging data that serve as navigators for motion correction (i.e. data-based navigation). The use of non-imaging data is described in Lin, Wei, et al. "Motion correction using an enhanced floating navigator and GRAPPA operations." *Magnetic Resonance in Medicine: An Official Journal of the International Society for Magnetic Resonance in Medicine* 63.2 (2010): 339-348; and Welch, Edward Brian, et al. "Spherical navigator echoes for full 3D rigid body motion measurement in MRI." *Magnetic Resonance in Medicine: An Official Journal of the International Society for Magnetic Resonance in Medicine* 47.1 (2002): 32-41. The contents of both of those references are incorporated herein by reference. External navigators (e.g., camera, respiratory motion sensors, cardiac motion sensors) can be used to estimate motion and correct for it retrospectively. The use of external navigators is described in Qin, Lei, et al. "Prospective head-movement correction for high-resolution MRI using an in-bore optical tracking system." *Magnetic Resonance in Medicine: An Official Journal of the International Society for Magnetic Resonance in Medicine* 62.4 (2009): 924-934; and Todd, Nick, et al. "Prospective motion correction of 3D echo-planar imaging data for functional MRI using optical tracking." *NeuroImage* 113 (2015): 1-12. The contents of both of those references are incorporated herein by reference. Self-navigation can also be used, where the acquired data itself is used to estimate and correct motion. The use of self-navigation references is described in Pipe, James G. "Motion correction with PROPELLER MRI: application to head motion and free-breathing cardiac imaging." *Magnetic Resonance in Medicine: An Official Journal of the International Society for Magnetic Resonance in Medicine* 42.5 (1999): 963-969; Feng, Li, et al. "XD-GRASP: golden-angle radial MRI with reconstruction of extra motion-state dimensions using compressed sensing." *Magnetic resonance in medicine* 75.2 (2016): 775-788; and Cordero-Grande, Lucilio, et al. "Sensitivity encoding for aligned multishot magnetic resonance reconstruction." *IEEE Transactions on Computational Imaging* 2.3 (2016): 266-280. The contents of those three references are incorporated herein by reference.

In one embodiment, a slice-based convolution approach can be used to correct for non-rigid, through-plane artifacts. A motion corrupted dataset can be divided in k-space based on frequency domain signal similarity to generate multiple motion corrupted datasets. New datasets can then be synthesized from each of the motion corrupted datasets using at least one convolution kernel, where estimating the kernels includes utilizing information from adjacent slices. The synthesized datasets are combined in k-space domain to form a motion corrected k-space. A motion corrected image is obtained from the motion corrected k-space via Fourier transform. In one embodiment, this technique can be coupled with other rigid body motion techniques.

For unpredictable motion, only some phase encoding (PE) lines are corrupted with motion. Since motion can be through-plane as well as in-plane, adjacent PE lines from both within a slice and adjacent to the slice can be used to synthesize the new datasets. A pseudo-randomized sampling pattern can be used to acquire data in k-space, ensuring that adjacent PE lines have no motion or incoherent motion. Such an approach can suppress motion artifacts by dispersing the error to neighbouring voxels/PE lines. This can be optimal for synthesizing new motion suppressed data from motion corrupted data. For example, a convolution kernel is used to synthesize a new point from a weighted sum of its neighboring points. If an error due to motion exists in any one point, its effect is dispersed to neighboring points. The result is a reduction in the appearance of the artifact.

Examples of sampling patterns that can be used include shuffle encoding (that uses a pseudo-randomized sampling pattern) or stepped encoding (where k-space data is split into subsets, and the subsets are interleaved). Sequential sampling pattern is another example of a sampling pattern that can be used.

The center k-space of the acquired motion corrupted dataset can be used to estimate a convolution kernel. This kernel can then be used to synthesize a new-k-space dataset. In one embodiment, L2 regularization can be used in the estimation of the kernel to account for signal to noise ratio loss due to synthesis. For example, regularization can be performed as in GRAPPA kernel estimation. One such implementation is described in Liu, Wentao, et al. "Improved parallel MR imaging using a coefficient penalized regularization for GRAPPA reconstruction." *Magnetic resonance in medicine* 69.4 (2013): 1109-1114, the contents of which is incorporated by reference.

Figure 4:
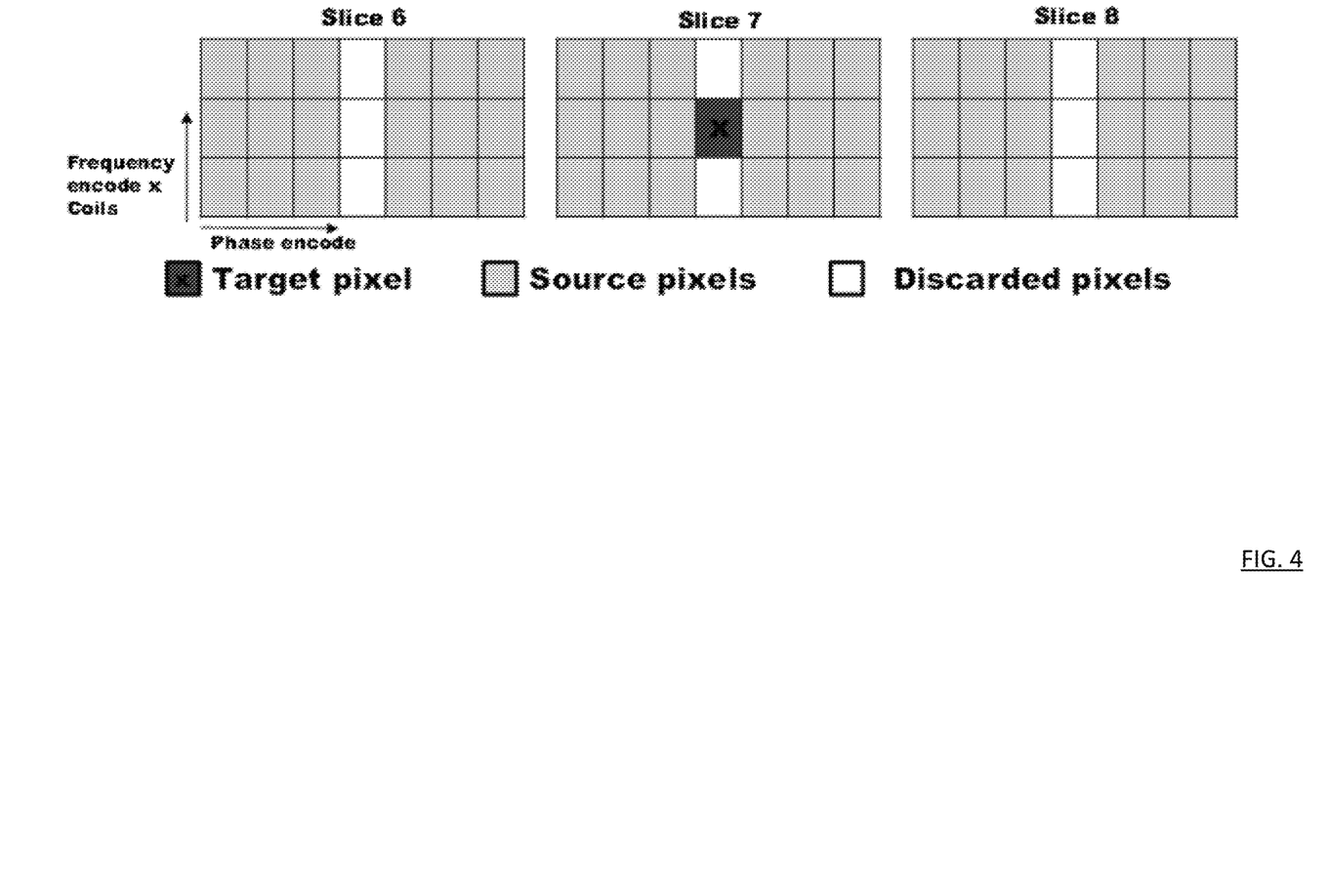
FIG. 4 illustrates synthesizing a kernel using a center slice and its adjacent slices.

FIG. 4 shows a center slice (e.g., slice 7) and two adjacent slices (e.g., slices 6 and 8), where each slice has source pixels and discarded pixels, and the center slice has a target pixel. For the kernel size of [3, 6], the target pixel in the center slice is synthesized with source pixels within the kernel from slices 6, 7, and 8.

Figure 5A:
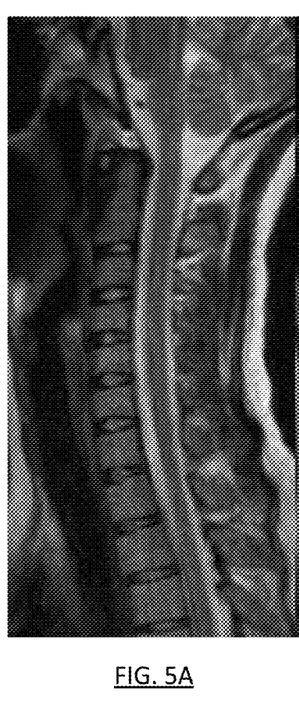
FIG. 5A shows a motion corrupted image of an object.
Figure 5B:
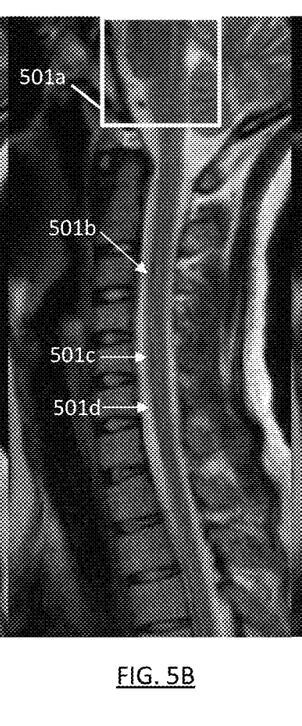
FIG. 5B shows the image from FIG. 5A after being synthesized without adjacent slice information.
Figure 5C:
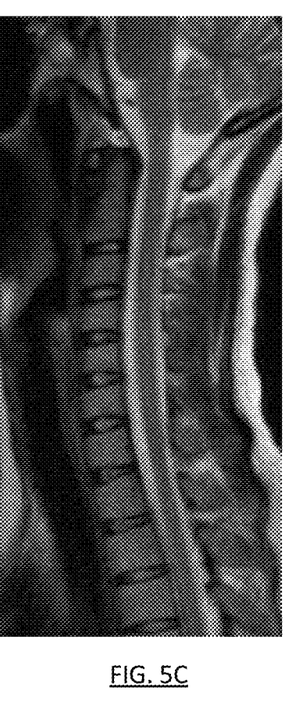
FIG. 5C shows the image from FIG. 5A after being synthesized with adjacent slice information.

Utilizing information from adjacent slices can reduce in-plane artifacts and improve image quality (compared to using only center slice information, or no kernel at all). FIGS. 5A, 5B, and 5C show a motion corrupted image where a kernel was not applied, a synthesized image without using adjacent slice information, and a synthesized image using adjacent slice information, respectively. As can be seen from the white vertical streak in 501*a* and the signal heterogeneity in the cord in 501*b-d*, the in-plane motion artifacts 501*a*-501*d* in the sagittal c-spine region are significantly reduced in FIG. 5C when adjacent slice information is used.

Figure 6A:
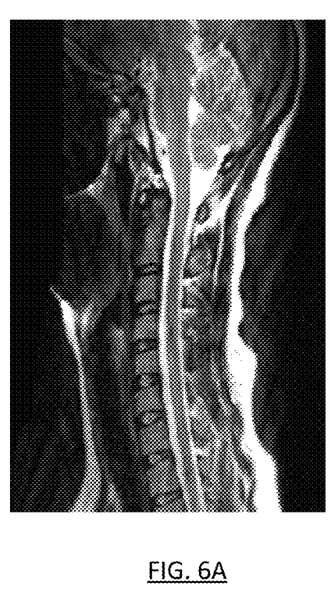
FIG. 6A shows a motion corrupted image of an object.
Figure 6B:
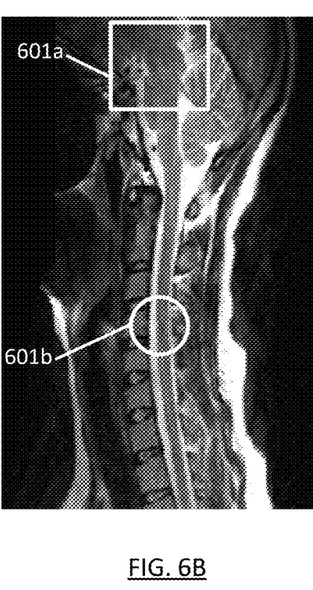
FIG. 6B shows the image from FIG. 6A after being synthesized without adjacent slice information.
Figure 6C:
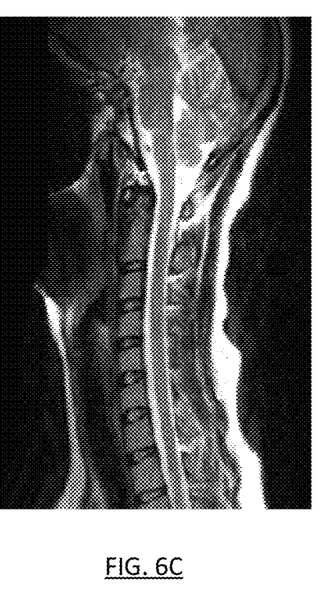
FIG. 6C shows the image from FIG. 6A after being synthesized with adjacent slice information.

Utilizing information from adjacent slices can also reduce through-plane artifacts (compared to using only center slice information, or no kernel at all). FIGS. 6A, 6B, and 6C shows a motion corrupted image where a kernel was not applied, a synthesized image without using adjacent slice information, and a synthesize image using adjacent slice information, respectively. As can be seen by comparing FIGS. 6A-6C, the through-plane motion artifacts 601*a*, 601*b* in the sagittal c-spine region are significantly reduced in FIG. 6C. For example, the signal intensity in the cord is more homogenous in FIG. 6C than FIG. 6B, and the black circle that appears in the middle of the white square in 601*a* is reduced in FIG. 6C.

Figure 7:
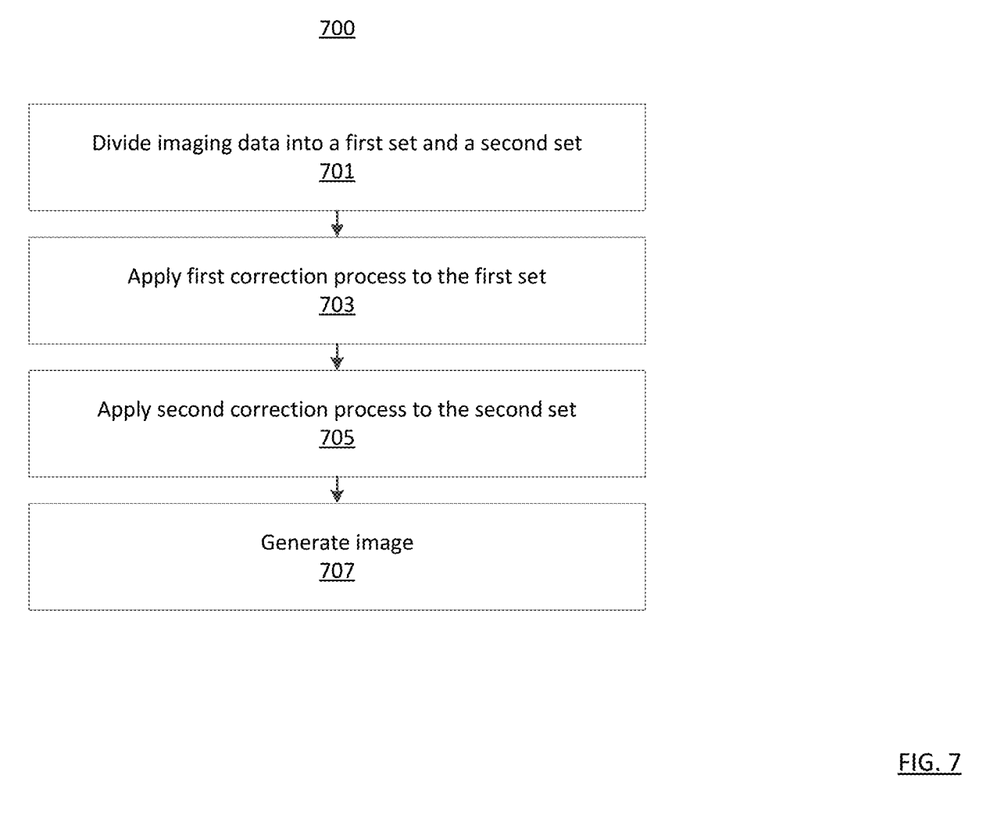
FIG. 7 shows a flowchart of an exemplary method described herein.

In one embodiment, it can be appreciated that the techniques discussed herein can be viewed as a method. FIG. 7 illustrates a flowchart outlining a method 700 according to an embodiment of the present disclosure.

Step 701 illustrates dividing imaging data into a first set corresponding to a first region of an object and a second set corresponding to a second region of the object. The second region is different than the first region, the first region has a first motion pattern, and the second region has a second motion pattern different than the first motion pattern. Some examples of possible first and second regions are the head, throat, heart, or lungs, although other regions are possible. Portions of data from the first and second set may or may not overlap. The first and second motion patterns can be any type of motion, such as periodic, aperiodic, rigid, non-rigid, sporadic, or non-sporadic.

In one embodiment, the first motion pattern is predictable, and the second motion pattern is unpredictable. In one embodiment, the first and second motion pattern are both predictable (or both unpredictable), but have unique characteristics (e.g. shape, size, frequency) that justify the usage of different correction processes. In one embodiment, the imaging data can be MRI data acquired from a scan of the object by the MRI apparatus 1.

The dividing in step 701 can be based on a coil sensitivity map, spatial patches based on anatomy, patches in k-space exploiting frequency domain signal similarity, or a combination thereof. The dividing can be done to split the imaging data based on unique motion characteristics of different regions within the scanned object. The first and second sets of data can make up the entirety of the imaging data, or a portion thereof. Of course, in other embodiments, more than two sets can be created from the dividing.

In an embodiment, navigators can be used to identify motion patterns for determining how to split the imaging data. For example, if navigators detect a first motion pattern coming from a first set of coils and a second motion pattern coming from a second set of coils, the first and second sets can be split accordingly. In a case such information is already known or easily predictable, navigators can be omitted.

Step 703 and step 705 are to apply a first correction process to the first set and apply a second correction process to the second set, respectively, where the first correction process and the second correction process are different.

Factors such as the first motion pattern, second motion pattern, first region of the object, and second region of the object can be considered when determining the correction process to use. For example, COCOA can be used for sporadic motion in the throat, while self-navigation can be used for periodic motion in the heart or lungs. Of course, other suitable correction processes (e.g. neural networks) can be used in other scenarios.

Further, if the imaging data was split according to signal similarity in the k-space, a convolution kernel can be estimated using center slice and adjacent slice information, as previously discussed. The convolution kernel can then be applied to synthesize a new dataset from the motion corrupted dataset using the convolution kernel.

Further, as previously noted, data rejection can be applied. If, for example, a correction process does not work or is not optimal for a given dataset, all or regions of that dataset can be rejected. Also, as previously discussed, navigators can be utilized in one or both correction processes.

Step 703 can be performed before, after, or in parallel to step 705. Of course, more than two correction process can be used in other embodiments. For example, in a case that the imaging data was split into three sets, three different correction processes can be used for each of the three divided sets.

Step 707 is to generate an image. The separately corrected imaging data can be combined to form one motion-corrected image. Step 707 can include performing a Fourier transform to convert frequency domain data into an image. Thereafter, the image can be displayed via the display 42.

The methods and systems described herein can be implemented in a number of technologies but generally relate to imaging devices and processing circuitry for performing the processes described herein. In one embodiment, the processing circuitry (e.g., image processing circuitry and controller circuitry) is implemented as one of or as a combination of: an application specific integrated circuit (ASIC), a field programmable gate array (FPGA), a generic array of logic (GAL), a programmable array of logic (PAL), circuitry for allowing one-time programmability of logic gates (e.g., using fuses) or reprogrammable logic gates. Furthermore, the processing circuitry can include a computer processor and having embedded and/or external non-volatile computer readable memory (e.g., RAM, SRAM, FRAM, PROM, EPROM, and/or EEPROM) that stores computer instructions (binary executable instructions and/or interpreted computer instructions) for controlling the computer processor to perform the processes described herein. The computer processor circuitry may implement a single processor or multiprocessors, each supporting a single thread or multiple threads and each having a single core or multiple cores.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals.

(1) An imaging apparatus, comprising: a plurality of detectors configured to capture imaging data from a scan of an object; and circuitry configured to divide the imaging data into a first set corresponding to a first region of the object and a second set corresponding to a second region of the object, wherein the second region is different than the first region, the first region has a first motion pattern, and the second region has a second motion pattern different than the first motion pattern, apply a first correction process to the first set, apply a second correction process to the second set, the second correction process being different than the first correction process, and generate an image including the first region and the second region, the image being generated based on a result of the first correction process and the second correction process.

(2) The apparatus of (1), wherein the first motion pattern is predictable and the second motion pattern is unpredictable.

(3) The apparatus of any of (1) to (2), wherein the first motion pattern is unpredictable and the first correction process includes applying a convolution kernel to the first set of the imaging data.

(4) The apparatus of any of (1) to (3), wherein the first motion pattern is predictable and the first correction process includes using self-navigation on the first set of the imaging data.

(5) The apparatus of any of (1) to (4), wherein the circuitry is further configured to reject regions of the imaging data having predetermined characteristics.

(6) The apparatus of any of (1) to (5), further comprising at least one navigator configured to obtain at least one of the first motion pattern and the second motion pattern.

(7) The apparatus of any of (1) to (6), wherein dividing to obtain the first set and the second set is done in k-space based on signal similarity; applying at least one of the first correction process and the second correction process includes using at least one convolution kernel; and the at least one convolution kernel is estimated from k-space using information from at least one center slice and slices adjacent to each of the at least one center slice.

(8) The apparatus of any of (1) to (7), wherein dividing to obtain the first set and the second set are based on a coil sensitivity map.

(9) The apparatus of any of (1) to (8), wherein the imaging apparatus is an MRI apparatus and the detectors are coils.

(10) A correction method, comprising: dividing imaging data into a first set corresponding to a first region of an object and a second set corresponding to a second region of the object, wherein the second region is different than the first region, the first region has a first motion pattern, and the second region has a second motion pattern different than the first motion pattern; applying a first correction process to the first set; applying a second correction process to the second set, the second correction process being different than the first correction process; and generating an image including the first region and the second region, the image being generated based on a result of the first correction process and the second correction process.

(11) The method of (10), wherein the first motion pattern is predictable, and the second motion pattern is unpredictable.

(12) The method of any of (10) to (11), wherein the first motion pattern is unpredictable and the first correction process includes applying a convolution kernel to the first set of the imaging data.

(13) The method of any of (10) to (12), wherein the first motion pattern is unpredictable and the first correction process includes using self-navigation on the first set of the imaging data.

(14) The method of any of (10) to (13), further comprising rejecting regions of the imaging data having predetermined characteristics.

(15) The method of any of (10) to (14), further comprising at least one navigator configured to obtain at least one of the first motion pattern and the second motion pattern.

(16) The method of any of (10) to (15), wherein the dividing to obtain the first set and the second set is done in k-space based on signal similarity; the applying of at least one of the first correction process and the second correction process includes using at least one convolution kernel; and the at least one convolution kernel is estimated from k-space using information from at least one center slice and slices adjacent to each of the at least one center slice.

(17) The method of any of (10) to (16), wherein dividing to obtain the first set and the second set are based on a coil sensitivity map.

(18) The method of any of (10) to (17), wherein the imaging apparatus is MRI data.

(19) A non-transitory computer-readable storage medium storing computer-readable instructions that, when executed by a computer, cause the computer to perform a method comprising dividing imaging data into a first set corresponding to a first region of an object and a second set corresponding to a second region of the object, wherein the second region is different than the first region, the first region has a first motion pattern, and the second region has a second motion pattern different than the first motion pattern, applying a first correction process to the first set, applying a second correction process to the second set, the second correction process being different than the first correction process, and generating an image including the first region and the second region, the image being generated based on a result of the first correction process and the second correction process.

(20) The non-transitory computer-readable storage medium of (19), wherein the first motion pattern is predictable, and the second motion pattern is unpredictable.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. An imaging apparatus, comprising:
  a plurality of coils configured to capture imaging data from a scan of an object; and
  circuitry configured to
    segment, based on respective coil sensitivity maps for each of the plurality of coils, a region included in the imaging data into a first region that is affected by artifact due to motion of a first anatomical region of the object and a second region that is affected by artifact due to motion of a second anatomical region of the object to divide the imaging data into a first set corresponding to the first region and a second set corresponding to the second region, wherein the second anatomical region is different than the first anatomical region, the first anatomical region has a first motion pattern, and the second anatomical region has a second motion pattern different than the first motion pattern,
    apply a first correction process to the first set, the first correction process being a process for correcting a motion of the first motion pattern of the object,
    apply a second correction process to the second set, the second correction process being a process for correcting a motion of the second motion pattern of the object and being different than the first correction process, and
    generate an image including the first anatomical region and the second anatomical region, the image being generated based on a result of the first correction process and the second correction process.

2. The apparatus of claim 1, wherein the first motion pattern is predictable and the second motion pattern is unpredictable.

3. The apparatus of claim 1, wherein the first motion pattern is unpredictable and the first correction process includes applying a convolution kernel to the first set of the imaging data.

4. The apparatus of claim 1, wherein the first motion pattern is predictable and the first correction process includes using self-navigation on the first set of the imaging data.

5. The apparatus of claim 1, wherein the circuitry is further configured to reject regions of the imaging data having predetermined characteristics.

6. The apparatus of claim 1, further comprising at least one navigator configured to obtain at least one of the first motion pattern and the second motion pattern.

7. The apparatus of claim 1, wherein the imaging apparatus is an MRI apparatus.

8. An imaging apparatus, comprising:
a plurality of detectors configured to capture imaging data from a scan of an object; and
circuitry configured to
divide the imaging data into a first set corresponding to a first region of the object and a second set corresponding to a second region of the object, wherein the second region is different than the first region, the first region has a first motion pattern, and the second region has a second motion pattern different than the first motion pattern,
apply a first correction process to the first set,
apply a second correction process to the second set, the second correction process being different than the first correction process, and
generate an image including the first region and the second region, the image being generated based on a result of the first correction process and the second correction process, wherein
dividing to obtain the first set and the second set is done in k-space based on signal similarity,
applying at least one of the first correction process and the second correction process includes using at least one convolution kernel, and
the at least one convolution kernel is estimated from k-space using information from at least one center slice and slices adjacent to each of the at least one center slices.

9. A correction method, comprising:
segmenting, based on respective coil sensitivity maps for each of the plurality of coils, a region included in the imaging data into a first region that is affected by artifact due to motion of a first anatomical region of the object and a second region that is affected by artifact due to motion of a second anatomical region of the object to divide imaging data into a first set corresponding to the first region and a second set corresponding to the second region, wherein the second anatomical region is different than the first anatomical region, the first anatomical region has a first motion pattern, and the second anatomical region has a second motion pattern different than the first motion pattern;
applying a first correction process to the first set, the first correction process being a process for correcting a motion of the first motion pattern of the object;
applying a second correction process to the second set, the second correction process being a process for correcting a motion of the second motion pattern of the object and being different than the first correction process; and
generating an image including the first anatomical region and the second anatomical region, the image being generated based on a result of the first correction process and the second correction process.

10. The method of claim 9, wherein the first motion pattern is predictable, and the second motion pattern is unpredictable.

11. The method of claim 9, wherein the first motion pattern is unpredictable and the first correction process includes applying a convolution kernel to the first set of the imaging data.

12. The method of claim 9, wherein the first motion pattern is unpredictable and the first correction process includes using self-navigation on the first set of the imaging data.

13. The method of claim 9, further comprising rejecting regions of the imaging data having predetermined characteristics.

14. The method of claim 9, further comprising at least one navigator configured to obtain at least one of the first motion pattern and the second motion pattern.

15. A correction method, comprising:
dividing imaging data into a first set corresponding to a first region of an object and a second set corresponding to a second region of the object, wherein the second region is different than the first region, the first region has a first motion pattern, and the second region has a second motion pattern different than the first motion pattern;
applying a first correction process to the first set;
applying a second correction process to the second set, the second correction process being different than the first correction process; and
generating an image including the first region and the second region, the image being generated based on a result of the first correction process and the second correction process, wherein
the dividing to obtain the first set and the second set is done in k-space based on signal similarity,
the applying of at least one of the first correction process and the second correction process includes using at least one convolution kernel, and
the at least one convolution kernel is estimated from k-space using information from at least one center slice and slices adjacent to each of the at least one center slice.

16. The method of claim 9, wherein the imaging data is MRI data.

17. A non-transitory computer-readable storage medium storing computer-readable instructions that, when executed by a computer, cause the computer to perform a method comprising:
segmenting, based on respective coil sensitivity maps for each of the plurality of coils, a region included in the imaging data into a first region that is affected by artifact due to motion of a first anatomical region of the object and a second region that is affected by artifact due to motion of a second anatomical region of the object to divide imaging data into a first set corresponding to the first region and a second set corresponding to the second region, wherein the second anatomical region is different than the first anatomical region, the first anatomical region has a first motion pattern, and the second anatomical region has a second motion pattern different than the first motion pattern,
applying a first correction process to the first set, the first correction process being a process for correcting a motion of the first motion pattern of the object, applying a second correction process to the second set, the second correction process being a process for correcting a motion of the second motion pattern of the object and being different than the first correction process, and generating an image including the first anatomical region and the second anatomical region, the image being generated based on a result of the first correction process and the second correction process.

18. The non-transitory computer-readable storage medium of claim 17, wherein the first motion pattern is predictable, and the second motion pattern is unpredictable.

* * * * *